United States Patent [19]
Ferrentino

[11] 3,898,727
[45] Aug. 12, 1975

[54] METHOD AND APPARATUS FOR JOINING A FLEXIBLE WAVEGUIDE TO ANOTHER ELEMENT

[75] Inventor: Antonio Ferrentino, Monza, Italy

[73] Assignee: Industrie Pirelli S.p.A., Milan, Italy

[22] Filed: Dec. 20, 1973

[21] Appl. No.: 426,495

[30] Foreign Application Priority Data
Feb. 2, 1973 Italy.................................. 19943/73

[52] U.S. Cl. .................................................... 29/600
[51] Int. Cl. ............................................. H01p 11/00
[58] Field of Search ............ 29/600, 601, 455, 464, 29/466; 285/363, 369, 294, 297; 333/98 R, 97 R

[56] References Cited
UNITED STATES PATENTS

| | | | |
|---|---|---|---|
| 330,624 | 11/1885 | Scaife ................................. | 285/294 |
| 3,374,450 | 3/1968 | Stewart............................... | 285/363 |
| 3,500,264 | 3/1970 | Floyd................................... | 285/363 |
| 3,560,029 | 2/1971 | Floyd................................... | 333/98 R |
| 3,654,577 | 4/1972 | Spinner et al...................... | 333/98 R |

Primary Examiner—C. W. Lanham
Assistant Examiner—James R. Duzan
Attorney, Agent, or Firm—Brooks Haidt Haffner & Delahunty

[57] ABSTRACT

Method and a tool for accurately aligning the axis of a flexible waveguide of circular section with another similarly shaped element of a telecommunication line, such as another flexible waveguide or a terminal, in which an accurately machined tool having a first cylindrical portion expansible in diameter and a second portion with an outer cylindrical surface accurately co-axial with the first portion is inserted into the waveguide with the first portion therein and the second portion extending therefrom. The first portion is expanded until it engages the inner surface of the waveguide and then a frusto-conical sleeve is mounted around the waveguide end in accurate axial alignment with the inner surface of the waveguide using a further sleeve mounted on the second portion of the tool. The space between the sleeve around the waveguide end and the outer surface of the waveguide is filled with a pourable resin, e.g., epoxy resin, which sets holding the last-mentioned sleeve co-axial with the inner surface of the waveguide. The end of the waveguide is levelled using a milling machine supported by said second portion of said tool. The other element is similarly prepared, and the sleeves are joined by bolts and an accurately ground ring encircling surfaces at the sleeve ends.

5 Claims, 4 Drawing Figures

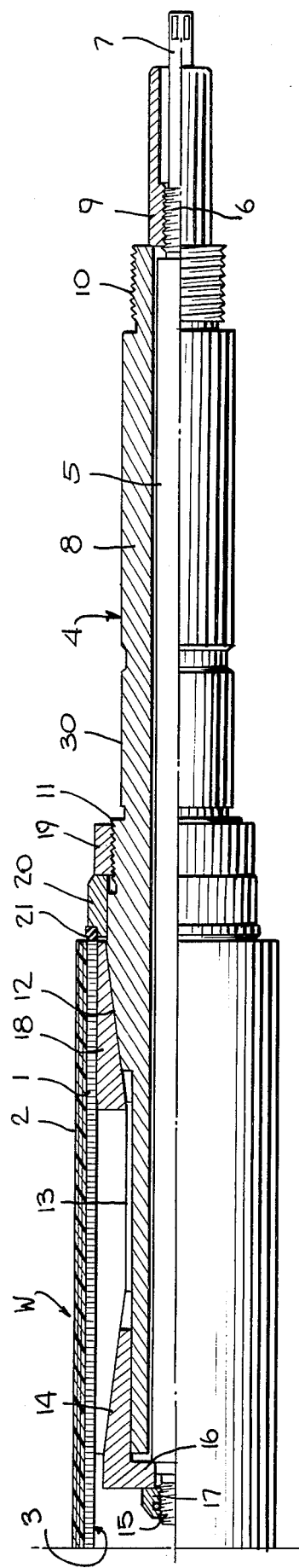
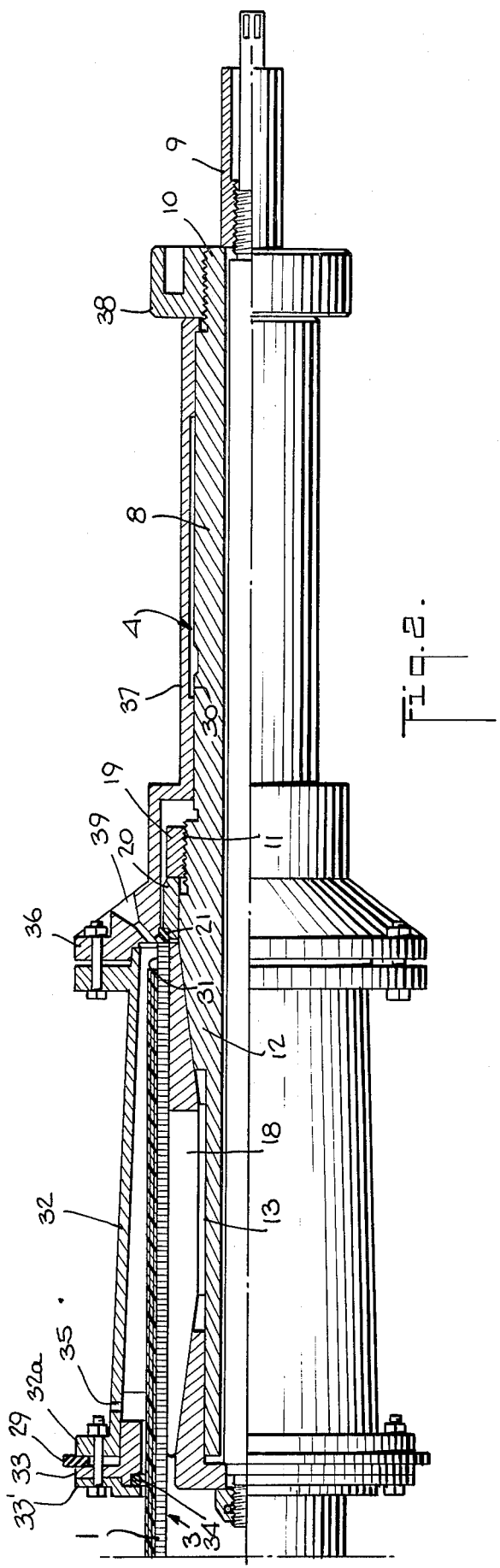

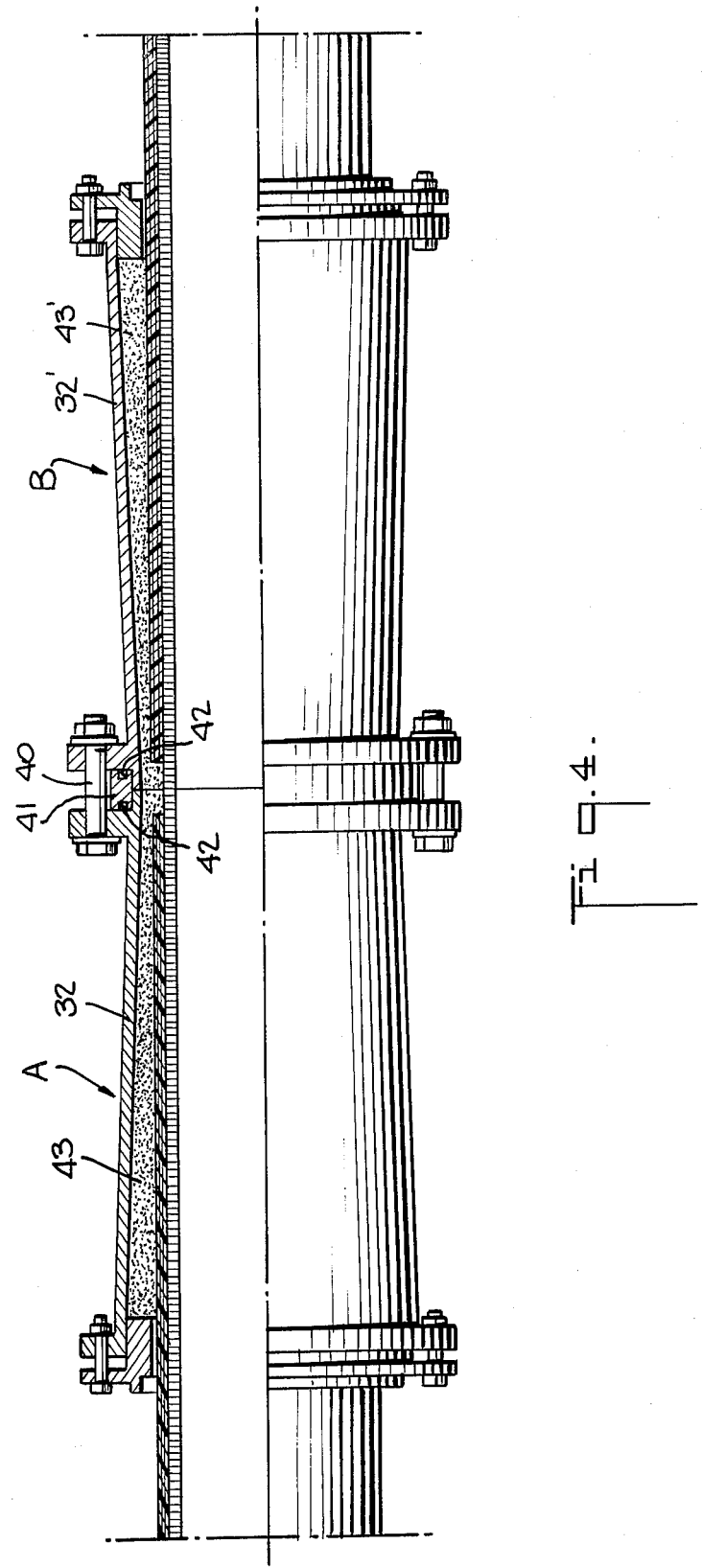

3,898,727

METHOD AND APPARATUS FOR JOINING A FLEXIBLE WAVEGUIDE TO ANOTHER ELEMENT

The present invention relates to a method for joining two elements in axial alignment, especially elements of telecommunication lines, at least one of the elements being a flexible waveguide.

It is known that waveguides may be classified in two categories, the first of which comprises rigid waveguides, having a length of a few meters, for example, not more than five meters, and the second flexible waveguides. The uninterrupted length of flexible waveguide can be much greater than the uninterrupted length of rigid waveguides. For example, flexible waveguides can have a length of 200 meters since they are constituted by a plurality of helically wound, conductive coils enclosed in a sheath of insulating, preferably thermoplastic, material. An example of a flexible waveguide is described in Italian Pat. No. 892,933 filed on May 8, 1970 by the same applicant.

One of the advantages provided by the second category of waveguides with respect to the first is that of requiring a smaller number of joints to build up a transmission line. Since the presence of each joint causes an attenuation of the signals transmitted through the waveguide, it is evident that the total attenuation for a transmission line comprising flexible waveguides is considerably smaller.

In order to avoid the occurrence of disturbances in the transmitted signals at the joints, it is necessary to maintain the two lengths of flexible waveguide to be joined in substantially perfect axial alignment. This result, however, is difficult to obtain because of the flexibility of the waveguides, which makes determination of the location of their geometrical axes rather difficult. This difficulty is further increased if it is desired to adopt hot welding methods, namely, methods usually adopted for conventional electric cables, to join the waveguides to each other or a terminal.

The present invention has, as one object, a method for joining two lengths of flexible waveguide or a flexible waveguide and another element of a transmission line, for example, a terminal, which keeps at a low level the degree of attenuation produced by the joint and which ensures that the two elements to be joined have substantially perfectly aligned axes, therefore, troublesome disturbances in the transmitted signals.

In accordance with the present invention for joining two elements of a telecommunication line, at least one of which is constituted by a flexible waveguide, the method comprises the following steps:

1. locating accurately the geometrical axes of the inner surfaces, which are of substantially cylindrical form, of each of said elements;
2. locking each of said elements in an exactly centered position with respect to the corresponding longitudinal geometrical axis; and
3. bringing together the end portions of the two elements to be joined and, after having aligned their geometrical axes, joining th two portions with relatively easily releasable connecting means.

The objects and advantages of the invention will be apparent to those skilled in the art from the following description of the presently preferred embodiment thereof, which description should be considered in conjunction with the accompanying drawings in which:

FIG. 1 is a side elevation view, partly in section, of an end portion of a flexible waveguide associated with the apparatus of the invention employed to locate the axis of the waveguide accurately;

FIG. 2 is a view similar to FIG. 1 showing the installation of part of the connecting means;

FIG. 4 is a side elevation view, partly in section, of a completed joint between a pair of flexible waveguides.

Figure 3:
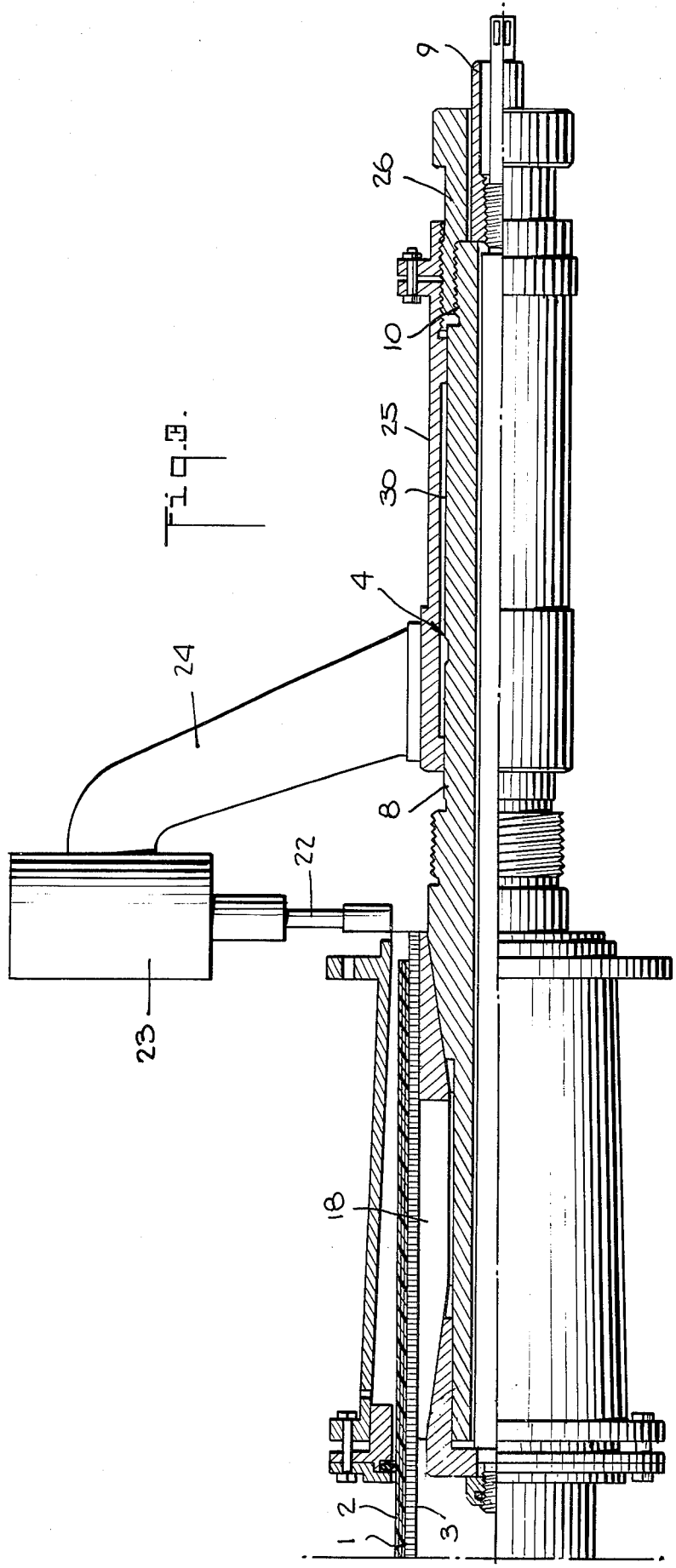
FIG. 3 is a view similar to FIG. 2 showing apparatus which may be used in trimming the end of the waveguide.

In FIG. 1 a length of flexible waveguide W comprises a wire or strap 1, made of enamelled copper or aluminum, helically wound up with very close turns and covered with a protective structure 2. The latter comprises a sheath of thermoplastic material and, in some cases, also comprises a winding of tapes and an armor of steel wires. See, for example, the Italian Pat. No. 892,933 referred to hereinbefore.

The first operation to be effected is that of locating exactly the geometrical axis of the waveguide, that is, the geometrical axis of the inner surface 3 of the helically wound strap 1. Said surface 3 is substantially cylindrical and is similar to the outer surface of the protective structure 2. However, because of the unavoidable irregularities which occur during its formation, the latter outer surface is not exactly rectilinear in section and varies in radius with respect to the axis of the inner surface 3.

In order to locate said geometrical axis of the inner surface 3, resort is had to rigid elongated body 4, the parts of which are manufactured and assembled with very close tolerances. Said body 4 comprises an inner shaft 5 and, mounted about it, with a predetermined small clearance, a tubular outer shaft 8. The inner shaft 5 has a first threaded end 6, which is provided with an extension 7, and a second threaded end 15.

The outer shaft 8 has a first threaded end 10, a cylindrical portion 30 adjacent to it, a threaded portion 11 at about midway of its length, and, beyond the portion 11, at the side opposite to the end 10, a portion 12 tapered as a frustum of cone, and another cylindrical portion 13. The frusto-conical portion 12 and the cylindrical portions 13 and 30 are accurately sized with the same tolerance degree and their longitudinal axes lie on the same straight line.

The end 6 of the inner shaft 5 engages with an internally threaded, adjusting knob 9, which abuts against the end 10 of the outer shaft 8. Around the portion 13 of the latter, there is slidably mounted a bushing 14, which is held in place at the outer end 15 of the inner shaft 5 by means of its flange-shaped portion 16 and a threaded ring 17 engaging the threads at the end 15.

The outer surface of the bushing 14 is tapered as a frustum of cone, the tapes being identical to the tapes of the portion 12 of the outer shaft 8. A hollow, cylindrical sleeve 18 is supported at one end by the outer surface of the bushing 14 and at its other end by the surface portion 12. The sleeve 18 is longitudinally cut as to provide a plurality of longitudinal slots therein and thereby to provide a plurality of fingers expansible like the jaws of locking pliers and engageable at their outer surfaces with the inner surface 3. The inner end surfaces of the sleeve 18 engaging the outer surface of the bushing 14 and the surface portion 12 are tapered like the surfaces they engage. The outer surface of the sleeve 18 is cylindrical and accurately sized.

By rotating the knob 9, the inner shaft 5 and the outer shaft 8 more relative to each other so that as a result, the outer surface of the bushing 14 and the surface portion 12 cause the sleeve 18 to expand, and it is thereby possible to vary the outer diameter of the sleeve 18.

In order to locate accurately the geometrical axis of the inner surface 3 of the end portion of the helically wound strap 1, the rigid body 4 is introduced into the end of the waveguide W to be joined, in such a way that the portion thereof disposed to the right of the frusto-conical portion 12 (FIG. 1) protrudes from the end of the waveguide W.

By turning the knob 9, the outer diameter of the sleeve 18 is increased from the minimum value it has at the time of the introduction to a value equal to the nominal diameter of the inner surface 3 of the helically wound strap 1. In this way, the correct interengagement is obtained, which locks the sleeve 18 against said inner surface 3. The axial position of the rigid body 4 inside the waveguide is established, and, if necessary, adjusted by means of another threaded bushing 19, which engages the threaded portion 11 of the outer shaft 8 and which abuts against a ring 20, slidable on the shaft 8 and provided with a sealing gasket 21. By changing the position of the bushing 19, the gasket 21 is caused to abut against the front of the helically wound strap 1 and the terminal end of the length of the waveguide W.

Owing to the high degree of precision in which the various parts constituting the rigid body 4 are manufactured and assembled, it is thus possible to determine the exact location of the geometrical axis of the inner surface 3 of the strap 1, since said axis is coincident with the axis of the rigid body 4.

By means of an appropriate tool, a portion of the sheath 2 adjacent to the end of the waveguide W is then removed. In this way, a corresponding portion 31 (FIG. 2) of the outer surface of the helically wound strap 1 is bared, and this facilitates, as described hereinafter, the adhesion between the joining member or body and the waveguide W (FIG. 2).

After this phase, the preparation of the joint body is started. A metallic frusto-conical sleeve 32 is arranged about the end portion of the waveguide W. Said sleeve 32 is supported at its end of greater diameter by means of a flanged ring 33. A counter-flange 33' and the ring 33 are secured to the flange 32a of the sleeve by bolts, a spacing ring 29 being interposed between the flange of the ring 33 and the flange 32a. The inner surface of the ring 33 has a predetermined radial clearance with respect to the outer surface of the sheath 2, which, as mentioned hereinbefore, is not regular. A sealing ring 34 is slidably mounted between the flange 33 and the counter-flange 33', so as to fit on the outer surface of the sheath 2 without applying forces on said sheath 2 directed perpendicularly to the axis of the waveguide W.

The wall of the frustro-conical sleeve 32 is provided with a through-hole 35 to allow the escape of air during the subsequent step of the present method, as described hereinafter. The smaller diameter end of the frustoconical sleeve 32 is flattened by grinding and is, moreover, bolted to a flange 36 situated at one end of a cylindrical sleeve 37. More precisely, the flange 36 is located outwardly of the ring 20 and tightly engages the gasket 21 with which said ring 20 is provided. The cylindrical sleeve 37 has its inner surface accurately sized with such an inner diameter as to closely fit the cylindrical, accurately sized portion 30 of the outer shaft 8, which is a part of the rigid body 4.

The length of the cylindrical sleeve 37 is such that the latter reaches the threaded end 10 of the outer shaft 8. Therefore, its axial position along the rigid body 4 can be adjusted by means of a threaded ring nut 38 engaging the threads on said end 10. The flange 36 is provided with a through-channel 39, through which it is possible to pour the material constituting part of the joint body, which material may, for example, be an epoxy resin.

Said last-mentioned resin material fills the inside of the frusto-conical sleeve 32, expelling the air therein contained through the through-hole 35. Moreover, said material, upon polymerizing and cooling, adheres completely to the outer surface of the sheath 2 of the waveguide, as well as to the outer end portion 31 of the helically wound strap 1.

As a consequence of cooling, the poured material can become at least partially detached from the inner surface of the frusto-conical sleeve 32. In this case, it is possible to lock the latter on the frusto-conical surface of the poured and set material by removing the spacing ring 29 and by tightening the bolts which secure the flange of the ring 33 and the counter-flange 33' to the flange 32a. In this way, the complete adhesion of the sleeve 32 to the surface of the poured material is re-established.

The smaller diameter end of th sleeve 32 will be substantially exactly co-axial with the inner surface 3 of the helically wound strap because of the way in which the frusto-conical sleeve 32, which encloses it, is made and assembled.

After the complete cooling of the poured resin, the cylindrical sleeve 37 and the ring nut 38 are removed by disengaging the bolts which secure the frusto-conical sleeve 32 to the flange 36. The front section of the helically wound strap 1 at its end portion 31 is then levelled and ground together with the corresponding portion of resin surrounding it, so that the length of waveguide W terminates exactly at the smaller diameter end portion of the sleeve 32.

In order to obtain a particularly accurate joining, it is advisable to carry out said levelling operation with the equipment illustrated in FIG. 3, which ensures that the finished front section of the length of the waveguide W is nearly exactly perpendicular to the axis of the inner surface 3 of the strap 1.

The equipment illustrated in FIG. 3 comprises a milling tool 22 actuated by a motor 23 which is supported, by means of a stanchion 24, by a cylindrical sleeve 25. The accurately sized inner surface of the sleeve 25 closely fits the accurately sized portion 30 of the outer shaft 8 and is, therefore, substantially exactly co-axial with the rigid body 4 of which said shaft 8 forms a part. A sleeve 25 is, moreover, connected to the threaded end 10 of the outer shaft 8 through a threaded ring nut 26, which can be rotated in such a way as to displace appropriately the milling tool 22 to obtain the desired levelling.

When the levelling is over, the above-described levelling equipment and the rigid body 4 are removed from the waveguide, the latter after having unscrewed the knob 9 to reduce the diameter of the sleeve 18. At this time, it is possible to carry out the accurate joining of the length of waveguide W, dealt with above, with another length which has been subjected to a similar treatment or to a terminal.

FIG. 4 illustrates the joining of one length A of waveguide to another length B of waveguide. The lengths A and B are mutually butt-spliced and are joined together by bolts 40 and with the interposition of a centering ring 41, situated at the ends of smaller diameter of the frustoconical sleeves 32 and 32' having internally thereof the resin bodies 43 and 43' obtained by pouring resin material therein as described hereinbefore.

The ring 41 is internally ground, so as to closely fit the supporting surfaces at the ends of the sleeves 32 and 32' and two sealing rings 42 are disposed on opposite sides thereof. In this way, said ring 41 is exactly centered between the two frusto-conical sleeves 32 and 32', so that it is ensured that the latter have their axes perfectly aligned.

The advantages of the method according to the present invention are evident. In fact, the joint body and the inner surface of the helically wound strap of the corresponding length of waveguide accurately aligned cooperate. Consequently, the lengths of waveguide which are connected together by said joining method have their axes perfectly aligned, and the disturbances or attenuations which occur as a result of the lack of alignment of the axes are practically eliminated.

In addition, the joint can be easily disassembled since it is sufficient to remove the bolts 40 and the ring 41, and this is desirable for a transmission line comprising flexible waveguides.

It is to be understood that the above-described joining method can be adapted, after the suitable modifications apparent to those skilled in the art, for connecting a length of flexible waveguide with another element of a transmission line, such as, for example, a terminal for the line.

What is claimed is:

1. A method for joining a flexible waveguide having a cylindrical inner surface and forming part of a telecommunication line to another element of said line having a similar cylindrical inner surface comprising:

inserting a first portion of an accurately sized, rigid body within said cylindrical surface of said waveguide, said portion being expandible in diameter and said body having a second portion exteriorly of said waveguide which is accurately aligned with respect to the axis of said expandible portion, expanding said first portion of said body into contact with said cylindrical inner surface of said waveguide, positioning a first hollow securing member around the exterior of said waveguide at the end thereof said member having an interior size greater than the exterior size of said waveguide to permit adjustment thereof with respect to the axis of said waveguide, aligning the axis of said member with said axis of said second portion of said body and hence, with the axis of said cylindrical inner surface of said waveguide, securing said member to said waveguide with said axis of said member so aligned, similarly positioning, aligning and securing on the exterior and at the end of said element a second hollow securing member of an interior size greater than the exterior size of said element to secure said second member to said element with its axis accurately aligned with the axis of said cylindrical inner surface of said element, each of said securing members having means for accurately aligning the axis of one thereof with the axis of the other thereof, after removal of said body, bringing said end of said waveguide adjacent to said element without a gap therebetween and aligning the axis of said waveguide with the axis of said element by aligning the axes of said first and second securing members with the use of said aligning means thereof, and securing said first member to said second member with their axes so aligned by releasable securing means.

2. A method as set forth in claim 1, wherein said waveguide has a protective outer layer and the interior size of said first securing member is greater than the outer size of said protective layer and wherein prior to the positioning of said first member and after the insertion of said body a portion of said protective layer at the end of said waveguide is removed.

3. A method as set forth in claim 1, wherein said first securing member is hollow, rigid sleeve having an internal diameter sufficiently greater than the external diameter of said waveguide to provide space between the interior of said sleeve and the exterior of said waveguide when the axes of the sleve and waveguide are aligned and further comprising supporting said sleeve at one end from the outer surface of said waveguide at a portion of the latter spaced from the end of the latter and securing said sleeve at its opposite end to said second portion of said rigid body to align the axis of said sleeve with the axis of said second portion of said body.

4. A method as set forth in claim 3, further comprising filling the space between said sleeve and the outer surface of said waveguide with a pourable resin material which becomes rigid after pouring prior to removal of said rigid body.

5. A method as set forth in claim 4, wherein said second securing member is also a hollow, rigid sleeve mounted on said element in the same manner as said first securing member is mounted on said waveguide and each of said securing members has an outwardly extending flange at its said opposite end, wherein said aligning means comprising exterior end portions of said sleeve at said opposite ends which are accurately positioned with respect to the axes of said sleeve and wherein said first member is secured to said second member by surrounding said exterior end portions of both sleeve intermediate the flanges thereon with a centering and sealing ring which closely fits and aligns said last-mentioned end portions and forcing said flanges together with threaded means.

* * * * *

UNITED STATES PATENT OFFICE
CERTIFICATE OF CORRECTION

PATENT NO. : 3,898,727
DATED : August 12, 1975
INVENTOR(S) : Antonio Ferrentino

It is certified that error appears in the above-identified patent and that said Letters Patent are hereby corrected as shown below:

| | | |
|---|---|---|
| Col. 1, | line 11 | after "second" insert --comprises-- |
| | line 47 | after "axes," insert --avoiding-- |
| | line 62 | "th" should read --the-- |
| Col. 2, | line 34 | after "to" insert --a-- |
| | line 54 | "outer" should read --other-- |
| | line 62 | after "cut" insert --so-- |
| Col. 3, | line 4 | "more" should read --move-- |
| | line 30 | "and" should read --at-- |
| Col. 4, | line 33 | "th" should read --the-- |
| | line 35 | after "strap" insert --1-- |
| Col. 6, | Claim 3 line 31 | after "is" insert --a-- |
| | line 35 | "sleve" should read --sleeve-- |
| | Claim 5 line 55 | "sleeve" should read --sleeves-- |
| | line 58 | "sleeve" should read --sleeves-- |

Signed and Sealed this twenty-eight Day of October 1975

[SEAL]

Attest:

RUTH C. MASON
*Attesting Officer*

C. MARSHALL DANN
*Commissioner of Patents and Trademarks*